Figure 1:
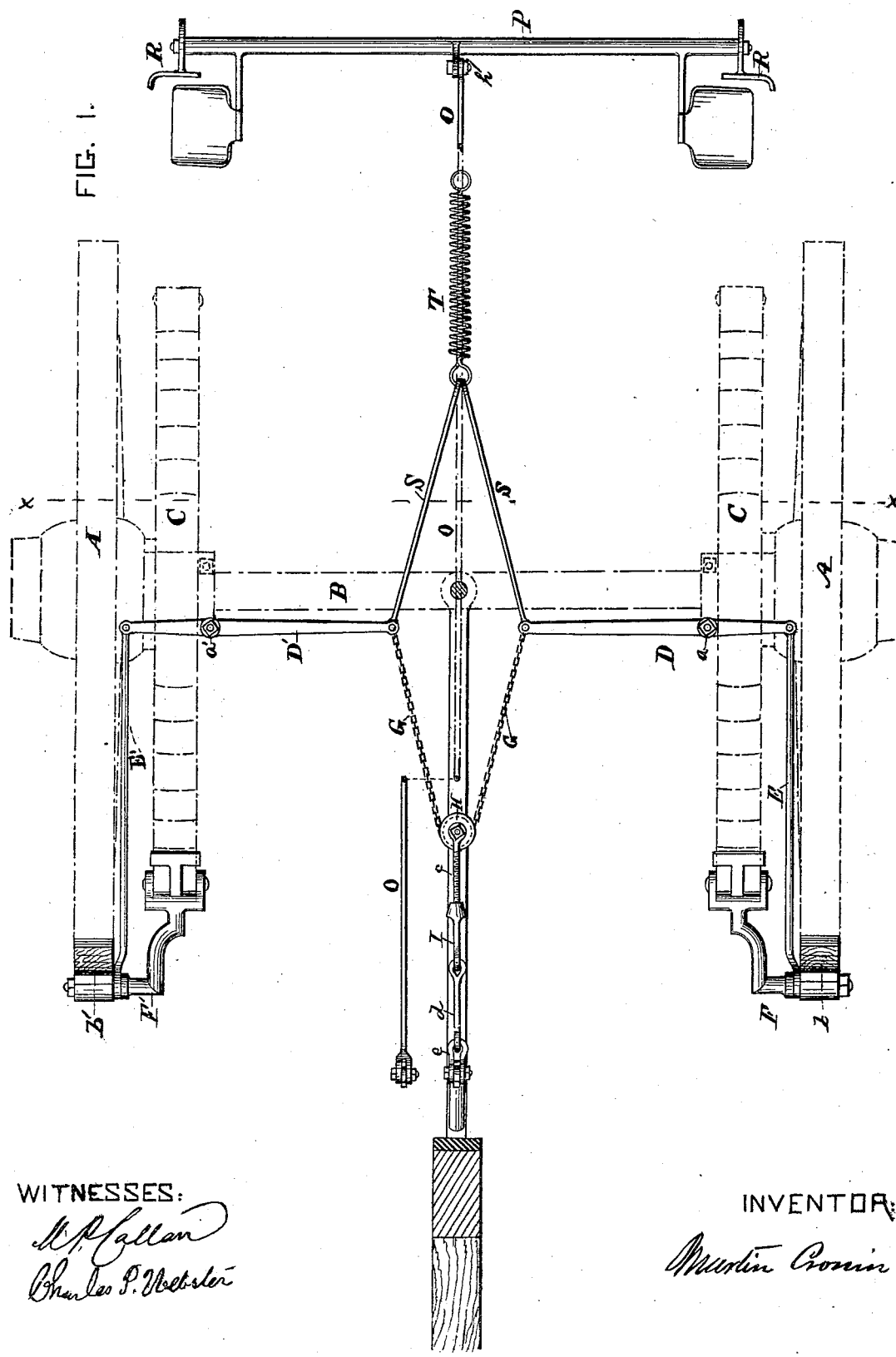

(No Model.) 3 Sheets—Sheet 1.

M. CRONIN.
Brake for Vehicles.

No. 241,193. Patented May 10, 1881.

WITNESSES:

INVENTOR:
Martin Cronin (No Model.)  3 Sheets—Sheet 2.
M. CRONIN.
Brake for Vehicles.
No. 241,193. Patented May 10, 1881.
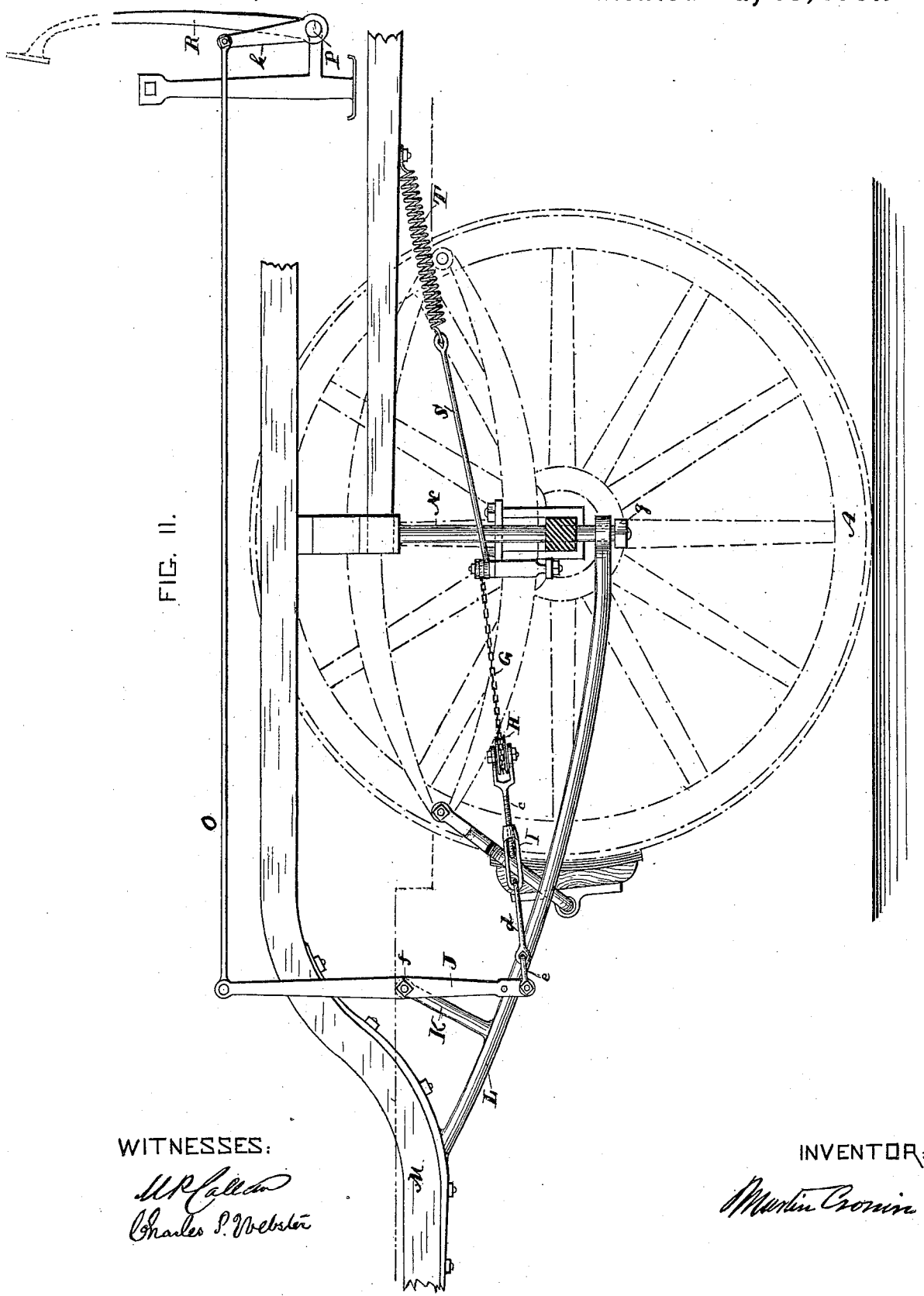
WITNESSES:
INVENTOR:

(No Model.)  M. CRONIN.  3 Sheets—Sheet 3.
Brake for Vehicles.
No. 241,193   Patented May 10, 1881.
FIG. III.
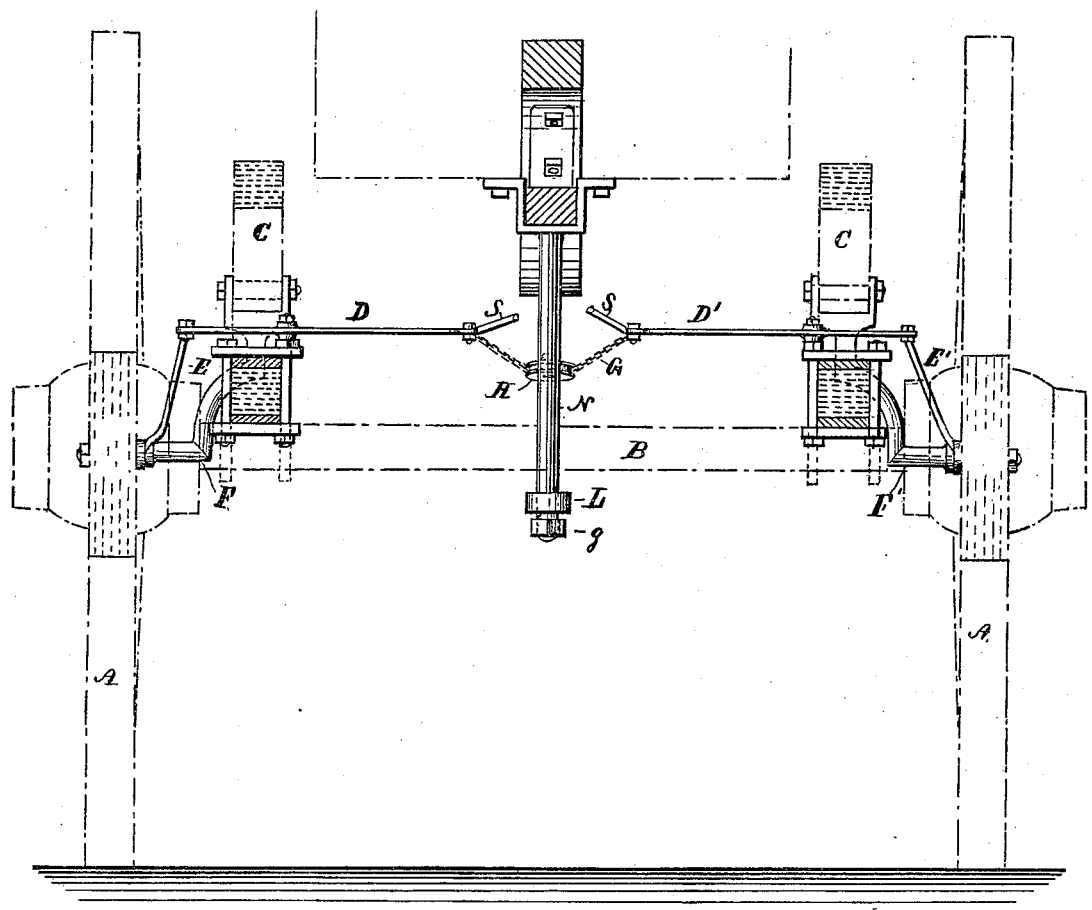

UNITED STATES PATENT OFFICE.

MARTIN CRONIN, OF WASHINGTON, DISTRICT OF COLUMBIA.

BRAKE FOR VEHICLES.

SPECIFICATION forming part of Letters Patent No. 241,193, dated May 10, 1881.

Application filed November 2, 1880. (No model.)

*To all whom it may concern:*

Be it known that I, MARTIN CRONIN, of Washington city, District of Columbia, have invented a new and useful Improvement in Brakes for Fire-Ladder Trucks and other Vehicles; and I do hereby declare that the following is a full, clear, and exact description of the same, reference being had to the annexed drawings, which form a part of this specification.

The object of my invention is to attach the brakes to the truck or other vehicle so that the brake-blocks will impinge on the rear side or edge of the front wheels, and at the same time provide compensating devices, so that the brake-blocks will always be in a proper position to act on the wheels, no matter in what position the wheels may be; and to this end my invention consists in securing the brake-bars to the rear of the front axle and steadying and supporting the same from the rear ends of the front springs.

It further consists of a chain and swiveled sheave or pulley for connecting the brake-levers to the operating-bars, so that the brake-bars are always in proper position for impingement on the wheels, whether the truck or other vehicle be traveling in a straight line or rounding a curve.

It further consists in certain details of construction hereinafter more fully described.

Referring to the accompanying drawings, Figure I is a top or plan view. Fig. II is a vertical longitudinal sectional view. Fig. III is a sectional view taken on the line *x x* of Fig. I.

Referring to the drawings, A A are the front wheels of the vehicle, B the front axle-tree, and C the springs, all shown in dotted lines and of the usual construction.

The brake-operating mechanism consists of two bars or levers, D and D', said levers being pivoted at *a* to collars, which are secured to the bottom of the spring and to the axle-tree, thus affording a strong and firm attachment or point of support for said levers D and D'.

To the outer ends of the levers D and D' are secured the rods E and E', which extend toward the rear of the vehicle and are secured to the rubber or shoe-holding arms or brackets F and F' in any desirable manner. A loose or pivotal attachment is preferred, in order that the brake or shoe-holding parts and the levers D and D' will be as free as possible from a wrenching or twisting strain. The rubber or shoe holding brackets or arms F and F' are constructed as shown, and are pivotally attached at their upper ends to the rear end of the springs C C, which serve to hold the shoes or rubbers securely in their proper position in relation to the periphery of the wheels.

To the inner ends of the levers D and D' is secured, in any desirable manner, a chain, G. This chain is passed over a swiveled sheave or pulley, H, the supporting stem or holder *c* of which is screw-threaded, to enable it to be received in a female screw in the link or turn-buckle I, by which the tension of the chain is regulated, and also to take up or allow for the wear of the brake-blocks or the springing or bending of the levers or rods which operate the same.

It will be apparent that, by means of the sheave or pulley and chain connection with the operating-levers, any turning of the wheels to the right or the left will cause the chain G to travel with the pulley, and at the same time the effective working of the levers and rods will not be impaired or diminished, but that the shoes or rubbers will always be in position for impingement on the periphery of the wheels, no matter whether the vehicle is traveling a straight line or rounding a curve.

The link or turn-buckle I, by means of intermediate links, *d* and *e*, is secured to a vertical bar or lever, J, said bar or lever being pivoted to the arm or stud K, at *f*, on the brace-bar L. The brace-bar L is secured at one end to the reach M, while the other end is secured to the king-bolt N by means of an eye or loop, through which the king-bolt passes. A nut, *g*, or other suitable fastening serves to keep the front end of the brace-bar in its proper position on the king-bolt.

To the upper end of the bar or lever J is secured a rod, O, which in turn is secured to the crank-arm *h* on the shaft P.

On the shaft P are secured the foot or other operating levers R, the same being located in front and near the driver's seat, (not shown in the drawings,) and within easy reach of the driver.

To the inner ends of the levers D and D' are also secured rods or chains S, which extend forward and are secured in any desirable manner to a spiral or other spring, T, said spring being secured to the under side of the tongue of the vehicle or in any convenient or operative position. The function of the spring is to draw the inner ends of the levers D and D' forward when the pressure has been removed from the lever R and the rubbers or shoes are removed from contact with the wheels.

Having thus fully described my invention, what I claim, and desire to secure by Letters Patent, is—

1. In a brake for ladder-trucks and other vehicles, the double brake-levers pivoted to the rear side of the front axle-tree, in combination with and operated by a chain passing over a swinging pulley, said pulley being connected to the operating-bars by a turn-buckle, whereby the position of the brake-levers and operating mechanism is relatively adjustable and a uniform pressure on both wheels at all times maintained, whether the vehicle is traveling in a straight line or rounding a curve, as set forth.

2. In a brake for vehicles, the swiveled and longitudinally-adjustable sheave or pulley, in combination with a chain, said chain being secured to the inner ends of two brake-operating levers, and by which said brake-levers are uniformly or equably operated.

3. The combination of the levers D and D' and rods E and E' with the brackets or supports F and F' and springs C C.

4. The combination of the foot-lever R, shaft P, arm $h$, rod O, bar J, links $e$ and $d$, link or turn-buckle I, screw-threaded sheave or pulley holder $c$, sheave H, chain G, levers D and D', rods E and E', brackets F and F', and brake blocks or rubbers $b$ and $b$ with the rods or chains S S and spring T, when constructed and arranged to operate substantially in the manner set forth.

MARTIN CRONIN.

Witnesses:
CHARLES P. WEBSTER,
M. P. CALLAN.